United States Patent [19]
Cheng et al.

[11] Patent Number: 5,701,516
[45] Date of Patent: Dec. 23, 1997

[54] HIGH-PERFORMANCE NON-VOLATILE RAM PROTECTED WRITE CACHE ACCELERATOR SYSTEM EMPLOYING DMA AND DATA TRANSFERRING SCHEME

[75] Inventors: Yu-Ping Cheng, San Jose; David Hitz, Sunnyvale, both of Calif.

[73] Assignee: Auspex Systems, Inc., Santa Clara, Calif.

[21] Appl. No.: 588,203

[22] Filed: Jan. 19, 1996

Related U.S. Application Data

[63] Continuation of Ser. No. 152,245, Nov. 12, 1993, abandoned, which is a continuation of Ser. No. 848,539, Mar. 9, 1992, abandoned.

[51] Int. Cl.$^6$ .............................. G06F 13/28; G06F 12/08
[52] U.S. Cl. .......................... 395/842; 395/855; 395/445
[58] Field of Search ........................ 395/842–848, 395/872, 877, 851, 445, 853–855

[56] References Cited

U.S. PATENT DOCUMENTS

| | | | |
|---|---|---|---|
| 3,771,137 | 11/1973 | Barner et al. | 395/425 |
| 4,075,686 | 2/1978 | Calle et al. | 395/425 |
| 4,268,907 | 5/1981 | Porter et al. | 395/425 |
| 4,476,526 | 10/1984 | Dodd | 395/425 |
| 4,500,954 | 2/1985 | Duke et al. | 395/275 |
| 4,504,902 | 3/1985 | Gallaher et al. | 395/425 |
| 4,669,043 | 5/1987 | Kaplinsky | 395/400 |
| 4,723,223 | 2/1988 | Hanada | 395/425 |
| 4,779,189 | 10/1988 | Legvold et al. | 395/425 |
| 4,800,489 | 1/1989 | Moyer et al. | 395/400 |
| 4,831,520 | 5/1989 | Rubinfeld et al. | 395/325 |
| 4,868,734 | 9/1989 | Idleman et al. | 395/275 |
| 4,888,691 | 12/1989 | George et al. | 395/700 |
| 4,905,141 | 2/1990 | Brenza | 395/425 |
| 4,972,316 | 11/1990 | Dixon et al. | 395/425 |
| 5,016,165 | 5/1991 | Tanikawa et al. | 395/425 |
| 5,119,485 | 6/1992 | Ledbetter, Jr. et al. | 395/425 |
| 5,175,825 | 12/1992 | Starr | 395/325 |
| 5,179,702 | 1/1993 | Spix et al. | 395/650 |
| 5,185,694 | 2/1993 | Edenfield et al. | 395/425 |
| 5,206,939 | 4/1993 | Yanai et al. | 395/400 |
| 5,276,823 | 1/1994 | Cutts, Jr. et al. | 395/575 |
| 5,283,884 | 2/1994 | Menon et al. | 395/425 |
| 5,297,258 | 3/1994 | Hale et al. | 395/275 |
| 5,313,612 | 5/1994 | Satoh et al. | 395/425 |
| 5,333,294 | 7/1994 | Schnell | 395/425 |
| 5,355,453 | 10/1994 | Row et al. | 395/200 |
| 5,388,242 | 2/1995 | Jewett | 395/425 |
| 5,388,243 | 2/1995 | Glider et al. | 395/425 |

*Primary Examiner*—Matthew M. Kim
*Attorney, Agent, or Firm*—Fliesler, Dubb, Meyer & Lovejoy

[57] ABSTRACT

A data storage system is coupled to a host computer system for the transfer of data between the host and a plurality of data storage devices. The data storage devices are coupled to a plurality of data transfer channels with each data storage channel be coupled to at least a respective one of the data storage devices. Each data transfer channel includes a data buffer and an autonomously operating controller for transferring between the channels data buffer and data storage device. A non-volatile random access storage memory is provided to store cached pages of data. An interface couples the data storage system to the host and through which data is transferred. A reconfigurable data path permits selective data transfer couplings between the data transfers channels, the non-volatile memory, and the interface. A controller directs the configuration of the data path and controls a direct memory access controller for burst transferring data between the interface and the channel data buffers, between the interface and the non-volatile memory and between the non-volatile memory and the channel data buffers.

16 Claims, 4 Drawing Sheets

HIGH-PERFORMANCE NON-VOLATILE RAM PROTECTED WRITE CACHE ACCELERATOR SYSTEM EMPLOYING DMA AND DATA TRANSFERRING SCHEME

Cross-Reference to Related Applications

This application is a Continuation of Ser. No. 08/152,245, filed Nov. 12, 1993, now abandoned, which is a continuation of Ser. No. 07/848,539, filed Mar. 9, 1992, now abandoned.

The present application is related to the following Applications, all assigned to the Assignee of the present Application:

1. PARALLEL I/O NETWORK FILE SERVER ARCHITECTURE, invented by Row, et al., U.S. Pat. No. 5,163,131, issued Nov. 10, 1992;
2. MULTIPLE FACILITY OPERATING SYSTEM ARCHITECTURE, invented by Hitz, et al., U.S. Pat. No. 5,485,579, issued Jan. 16, 1996;
3. ENHANCED VMEBUS PROTOCOL UTILIZING SYNCHRONOUS HANDSHAKING AND BLOCK MODE DATA TRANSFER, invented by Daryl D. Starr, U.S. Pat. No. 5,388,231, issued Dec. 29, 1992;
4. HIGH SPEED, FLEXIBLE SOURCE/DESTINATION DATA BURST DIRECT MEMORY ACCESS CONTROLLER, invented by Daryl D. Starr, U.S. Pat. No. 5,175,825, issued Dec. 29, 1992.
5. BUS LOCKING FIFO MULTI-PROCESSOR COMMUNICATION SYSTEM, invented by Pitts, et al., AUSP7213, application Ser. No. 07/474,350, filed Feb. 2, 1990, now abandoned.

BACKGROUND OF THE INVENTION

1. Field of the Invention

The present invention is generally related to caching disk controllers and, in particular, to disk controller systems providing for high performance, integrity protected write data caches established as integral components of a disk storage processor.

2. Description of the Related Art

There have been substantial advancements in all phases of computer technology and design. However, certain aspects of modern complex operating systems have greatly increased the required performance of the data storage sub-system. Specifically, UNIX and similar multi-tasking operating systems typically perform disk data transfer operations divided into sub-operations as necessary to support the multi-tasking activity of the operating system. Consequently, the actual data transfer operations performed by the disk sub-system are poorly optimized and therefore directly degrade overall system performance.

A commonly utilized component of the UNIX operating system is a communications layer know as Network File System (NFS). The NFS layer provides a network control protocol that permits convenient logical access to the disk storage sub-systems of remote network connected computer systems. The design of the NFS protocol is essentially stateless in that each atomic NFS operation proceeds without presumption of the pre-existing data transfer state of the disk storage sub-system. Thus, many NFS directed data transfer operations are repeated and even poorly ordered in their submission to a disk storage sub-system.

A typical solution to improving disk storage sub-system performance has been to implement a read data cache either in a specialized RAM cache memory or within a buffer pool formed within the main memory array of the computer system. The latter approach is particularly advantageous since, as in the UNIX operating system, virtually referenced memory objects can be stored in the read data cache. This, in turn, allows a greater potential optimization of the process of satisfying read data requests by reference to the virtual cache and without requiring further time consuming virtual to physical translations or even data transfer operations through the disk storage sub-system.

A separate, specialized cache RAM approach typically operates the cache in a physical block number mode. An advantage presented by this approach is that physical read data transfers can be ordered to maximize the data transfer bandwidth of the actual sub-system disk drives. However, the virtual referencability is lost.

Write data caching has also been utilized to enhance performance. However, a substantial data integrity problem arises in that data stored by the disk storage sub-system will not be accurate until all data writes have completed to disk. A number of approaches have been adopted to minimize or prevent data corruption in the instance where all write data is not properly updated to disk. The simplest and most common approach is to implement a write cache in main memory subject to control by the UNIX file system (UFS) and implement a flushing algorithm whereby all data in the cache is written out to disk on a fairly frequent time-controlled basis. Where even this limited exposure is considered too great a risk, a mechanism known as synchronous writes has been developed and widely applied. This mechanism, required for compliance with the NFS protocols, requires that all data writes complete entirely through to "safe storage", typically a physical disk, before being acknowledged as completed to the NFS server originating the data transfer. This of course has the disadvantage of imposing a substantial time penalty on every NFS write.

Finally, a write data cache in main memory can be made substantially immune to the loss of data by isolating the buffer in non-volatile memory. This approach also has a number of difficulties associated with it, including management of the restoration of the state of the operating system when the system is rebooted and ensuring that writes from the write cache can correctly complete to the disk storage sub-system reliably. An advantage of this write cache design is that all read and write data is logically managed by the UNIX file system directly. Therefore, all overlapping read and write requests can be centrally managed and resolved. A corresponding disadvantage, of course, is that the UFS must be modified to understand and implement a write cache buffer.

Accordingly, there is a need for a comprehensive solution to improving the through put and control of cache memories in connection with a disk storage subsystem in the context of complex operating systems.

SUMMARY OF THE INVENTION

A general purpose of the present invention is to provide a high performance storage processor system incorporating non-volatile cache RAM for supporting an optimized write cache operation with respect to multiple data storage devices.

This is achieved in the present invention by implementing a data storage system that can be coupled to a host computer system for the transfer of data between the host and a plurality of data storage devices. The data storage devices are coupled to a plurality of data transfer channels with each data storage channel being coupled to at least a respective one of the data storage devices. Each data transfer channel includes a data buffer and an autonomously operating controller for transferring data between the channels data buffer and data storage device. A non-volatile random access storage memory is provided to store cached pages of data. An interface couples the data storage system to the host and through which data is transferred. A reconfigurable data path permits selective data transfer couplings between the data transfers channels, the non-volatile memory, and the interface. A controller directs the configuration of the data path and controls a direct memory access controller for burst transferring data between the interface and the channel data buffers, between the interface and the non-volatile memory and between the non-volatile memory and the channel data buffers.

By storing cache pages of write data in the non-volatile memory, an immediate acknowledgement of the data write can be issued to the host computer system while allowing the controller to process the relationship between the cached pages of data in the non-volatile memory for optimizing subsequent data transfer operations necessary to move the cached pages of data from the non-volatile memory to the channel data buffers.

Accordingly, an advantage of the present invention is that it directly supports the management of multiple data storage channels in a consistent, highly integrated manner. Support for both simple and complex control arrays of data storage devices are transparently managed.

Another advantage of the present invention is that it manages and properly resolves all combinations of overlapping data transfer requests, including exact and inexact overlaps, read after write, and write after write ordering of data transfers.

A further advantage of the present invention is that it queues data transfer requests through a prioritization and arbitration scheme whereby write transfer operations from cache to disk are increasingly optimized under increasing data transfer activity.

Yet another advantage of the present invention is that read requests are treated as cache bypasses thereby maximizing the availability of the cache for cached write requests optimizations. Further, the capability for selectively caching write requests based on file system identification is provided.

Still another advantage of the present invention is that it requires a minimum change to a conventional multi-tasking operating system kernel in order to permit complete implementation of the present invention. The only change necessary is to allow the kernel file system control software to identify whether specific write requests are to be cached or not. Consequently, the present invention is isolated and correspondingly insensitive to the particular implementation, mechanics and operation of the system software in and above the storage processor device driver level. No change to the storage processor device driver is required.

A still further advantage of the present invention is that it provides for a robust mechanism for identifying the presence of valid cached pages of data on a restart of the operating system and for reconstructing the proper order of write operations for data found to exist in the non-volatile cache memory. As part of the initial evaluation of valid cache data present in the non-volatile memory, a control mechanism is maintained to both identify and verify the drive storage device configuration.

Yet still another advantage of the present invention is that it readily manages the presence of mirrored drive storage configurations in a consistent and substantially transparent operational manner relative to all aspects of the present invention.

BRIEF DESCRIPTION OF THE DRAWINGS

These and other intended advantages and features of the present invention will become appreciated and better understood when considered in connection with the accompanying drawings, wherein like referenced numerals throughout the figures designate like parts, and wherein.

DETAILED DESCRIPTION OF THE INVENTION

Figure 1:
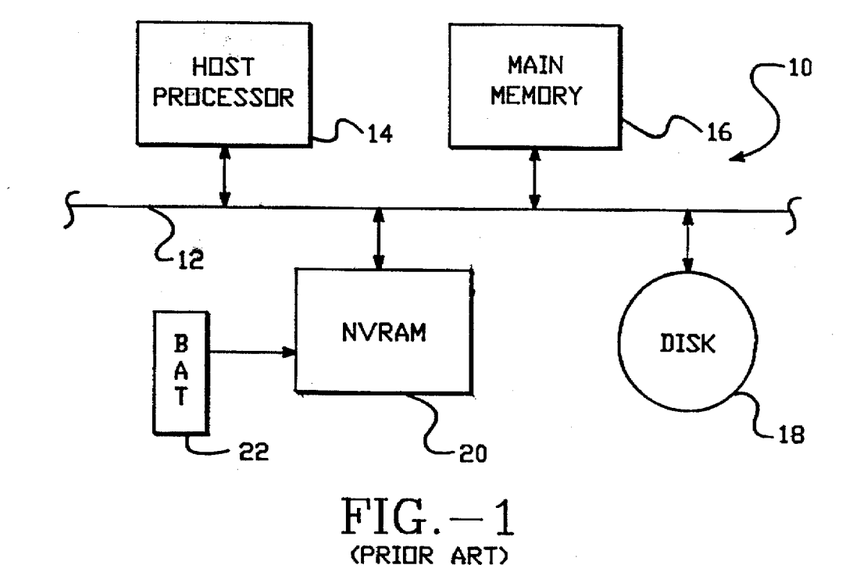
FIG. 1 is a block diagram of a conventional approach for providing a non-volatile write cache in a multi-tasking, multi-user operating system environment.

A prior art approach to providing for a non-volatile write data cache in a computer system supporting a multi-tasking, multi-user operating system is shown in FIG. 1. The prior art system 10 includes a host processor 14 coupled, in a typical fashion, to a VME backplane bus further supporting a main memory array 16 and a disk sub-system 18, including a disk controller that directly supports conventional SCSI or SCSI-2 data transaction operations. A non-volatile random access memory (RAM) array 20 is also supported by the bus 12. The non-volatile RAM array 20, at a minimum, maintains write data ultimately destined to the disk system 18. A battery 22 is provided to maintain power to the non-volatile RAM array 20 in the absence of ordinary system power. The battery 22 allows the cache data present in the non-volatile RAM array 20 to be maintained through a power cycling of the system 10, thereby allowing data maintained in the non-volatile RAM array 20 to be updated to the disk sub-system 18 as part of an error recovery process.

An advantage of the system 10 is the data write operations can be directed through the non-volatile RAM array 20 resulting in a substantial increase in the apparent disk sub-system 18 performance. That is, where further operations for an executing process must wait until a pending write request has completed to the disk sub-system 18, completion of the write to the non-volatile RAM array 20 allows the write acknowledgment to be returned much sooner. Thus, apparent performance is increased in proportion to the ratio of disk sub-system write access speed to the write access speed of the non-volatile RAM array 20.

On closer examination of the system 10, a number of disadvantages become apparent, particularly as the data transfer loading of the system 10 increases. Since all disk related data transfer operations must process through the host processor 14, a data write to the non-volatile RAM array 20 must eventually be followed by a return transfer to the host processor 14 followed by the actual data write to the disk sub-system 18. However, the data bandwidth of the bus 12 is finite. Thus, the design approach of system 10 will incur a substantially increased bus loading factor, estimated to be on the order of 50%, particularly increasing with data request activity. In addition, since data transfers from the non-volatile RAM 20 to the disk sub-system 18 are likely to be of low priority relative to other data transactions, the non-volatile RAM array 20 will typically tend to rapidly fill with data, resulting in a significant slow-down circumstance where the host 14 requires to write data to the non-volatile RAM array 20, but first an adequate amount of cached data must be flushed back to the host 14 from the non-volatile RAM array in order to allow the initial write operation.

Finally, a limitation of the system 10 involves the need to manage the data in the non-volatile RAM array 20 dynamically through the operation of the system 10 and as part of an error recovery routine following a system restart. In the former case, a control structure necessary to track the data present in the non-volatile RAM array 20 would desirably be stored by the host processor 14 in the host's own local memory in order to speed the necessary management operations. However, such structures would be lost on a system shut down. Therefore, a management control structures must be maintained as an integral component of the cached data within the non-volatile RAM array 20. Unfortunately, every access of such control structures would result in further traffic across the bus 12 and a corresponding and likely significant reduction in the overall performance of the system 10.

Figure 2:
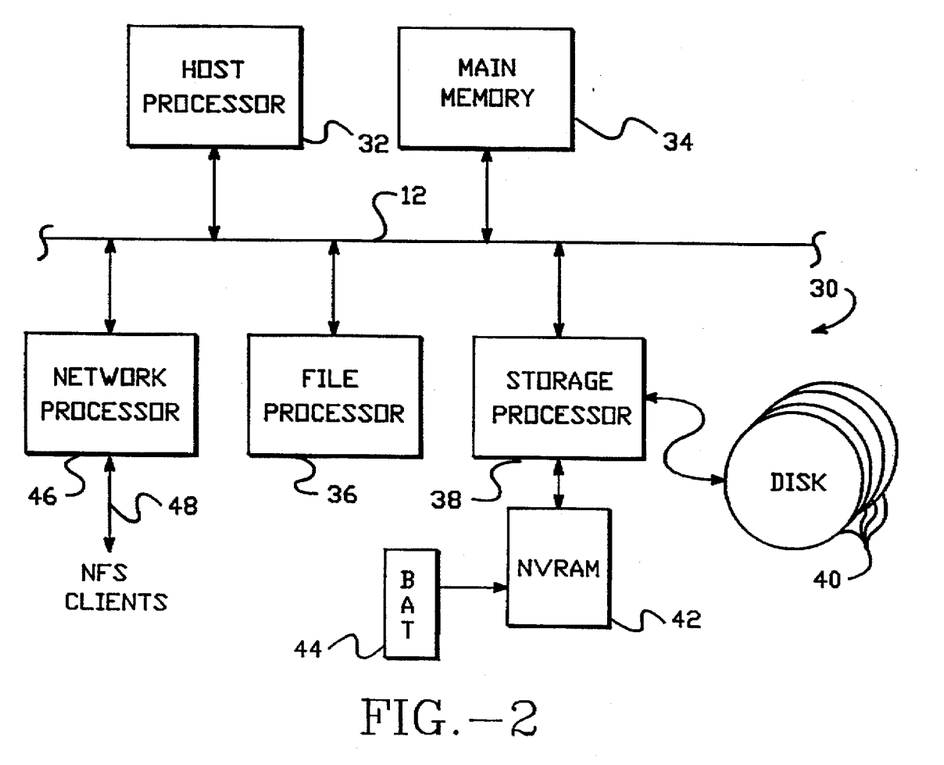
FIG. 2 is a block diagram of a computer system employing a high integrity write cache accelerator sub-system in accordance with a preferred embodiment of the present invention.

A high performance write cache system 30, constructed in accordance with the present invention, is shown in FIG. 2. There, a host processor 32, main memory 34, file processor 36 and storage processor 38 are interconnected by a high-speed bus 12. The bus 12 and high-speed data transfer protocols, as well as the preferred architectural design and implementation of the host processor 32, main memory 34, file processor 36 and storage processor 38 are disclosed and discussed in detail in the above-identified co-pending related applications; which applications are hereby expressly incorporated by reference herein.

The storage processor 38 includes a non-volatile RAM array 42 with battery backup 44 for selectively storing write data intended for any one of an array of disks 40, numbering from as few as one disk drive to as many as 60 drives on 10 parallel SCSI data channels. The architecture of the system 30, fully consistent and with the present invention permits up to at least three fully functional and independently operating storage processors 38, with respective attached non-volatile RAM arrays 42 and backup batteries 44, to be connected to the bus 12. Transfer of data between the bus 12 and remote NFS clients and servers is provided by way of a network processor 46 directly supporting one or more Ethernet type local area networks (LANs) 48.

In the preferred circumstance, NFS type data transfer requests are processed through the network processor 46 and passed to the file processor 36. In turn, the file processor 36 identifies a storage location for the NFS request referenced data and passes this control information to the storage processor 38. Consequently, the storage processor 38 is operating essentially at a physical level; the control information provided specifies data using disk and, in the case of SCSI drives, logical sector identifications. Consequently, all write cache control operations and recovery procedures will, in accordance with the present invention, occur substantially outside of the conventional boundaries of an operating system executed by the computer system 30. That is, the write caching control, error recovery control and write data optimization operations occur at a level below that of the operating system device driver level having responsibility for interface control over the storage processor 38.

The only fundamental kernel level change required for the full utilization of the present invention is implemented in the UNIX file system control code as executed by the file processor 36. Specifically, the present invention contemplates utilization of a system administration level file such as/etc/fstab to identify file systems that are expressly to be treated as subject to write caching. The default circumstance is to not cache write data operations. By identifying those file systems that are to be subject to write data caching, the file processor 36, in the processing of a data transfer request involving write data, preferably identifies whether the data write may be cached by the type of data write request message sent to the storage processor 38. This capability is of some substantial significance in that the / (root) and, typically, the /usr file systems in a SunOS implementation of the UNIX operating system should be left uncached. While it is the ultimate intention of the present invention to ensure that all write data operations ultimately succeed with a proper transfer of data to the disk 40, the transition prior to the non-volatile RAM error recovery and restoration remaining cached write data to the disk 40, requires that at least the root file system must be assured of correct operation as necessary for initialization to at least the maintenance mode level of the operating system.

The only other alterations to the operating system executed by the system 30 is the addition of a system administration user level program to administer the state of the non-volatile RAM array 42, to collect statistics, and obtain the current status of the non-volatile RAM array 42. This user level program need only be capable of passing a message ultimately to the low level embedded control routines directly executed by the storage processor 38. These system level commands include:

1. Init—this option is normally run automatically during rc.boot. It initializes the non-volatile RAM array and puts it into a off state. In examining the contents of the non-volatile RAM array 42, if the storage processor 38 finds any unwritten cache pages, the storage processor 38 attempts a write data flush operation to transfer the data to the disks 40. If the writes are successful, the non-volatile RAM array is placed in the off state and is otherwise ready for use. Otherwise, the non-volatile RAM array is put a dirty state indicating that the non-volatile RAM array 42 contains cache pages that cannot be written to the disks 40. If, in processing the control structures, associated with the non-volatile RAM array 42 and maintained in non-volatile RAM, fails, the non-volatile RAM array is put in a bad-checksum state. A write to disk can fail either due to disk errors or a change in the disk 40 configuration. The system administrator has the options to a) throw away the data and continue; b) correct the underlying cause of the data error and retry the data write; c) reconfigure the system and reboot; and d) save the data and continue. If the storage processor is unable to place the non-volatile RAM array 42 in a off state, an error message is passed back to the host processor 32 and ultimately to the system administrator reflecting the error condition.

2. On [page_count]— puts the non-volatile RAM array 42 in an on state. This command is recognized only if the state of the non-volatile RAM array 42 is currently off. The optional page_count value allows the system administrator to specify a number of cache pages less than the maximum available number of cache pages to be used for write caching. In a 1MByte×32 data space, 128 8 KByte cache pages can be allocated. The default is to use all available memory within the non-volatile RAM array 42 for cache pages. Using a lesser number of cache pages may be of use in evaluating performance of the write cache.

3. Off—put the non-volatile RAM array 42 back to the off state. This command is only recognized if the non-volatile RAM array 42 is currently in the on state. In changing state, the storage processor 38 attempts to flush all unwritten cache page data stored by the non-volatile RAM array 42 to the disks 40. If the flush fails, the non-volatile RAM array 42 is put in the dirty state.

4. Purge—when the non-volatile RAM array 42 is dirty, this command causes all unwritten data present in the cache pages of the non-volatile RAM array 42 to be discarded and forces the state of the non-volatile RAM array 42 to off.

5. Flush—when the non-volatile RAM array 42 is in either the on or dirty states, this command directs the storage processor 38 to initiate write operations to transfer all unwritten data in the non-volatile RAM array 42 to the disks 40. The state of the non-volatile RAM array is left either on, if the state was initially on and no write failures were encountered in the write data transfer operations, or dirty, where the initial state was dirty or a write failure occurred, and off, where the initial state was dirty and no write failures occurred.

6. State—this command directs the storage processor 38 to report back the current state of the non-volatile RAM array 42.

7. Errors—this command directs the storage processor 38 to return the list of currently un-writable cache pages as then maintained in the non-volatile RAM array 42.

A multiple stage message passing protocol is utilized to implement these commands. In general, a 128 byte message is composed by a processor, for example the host processor 32, and transferred to a reserved area of the main memory 34. A single word (32 bits wide) message descriptor is then passed by the host processor directly to, for example, a command FIFO on the storage processor 38. This message descriptor identifies the location of the message in main memory 34 and basic information as to the action to take with respect to the message. Typically, the storage processor 38 will undertake to transfer at least an image copy of the message from main memory to local memory onboard the storage processor 38. The storage processor 38 then evaluates the message and, as appropriate, performs the corresponding function or functions. Then, the storage processor 38 will substantially overwrite the original message in main memory with a reply message giving, for example, the completion status of the requested operation and reporting the state of the non-volatile RAM array 42. The storage processor 38 will then send a reply message descriptor to the command FIFO present in the originating processor, usually the file processor 36. Upon examining the reply message in main memory 34 identified by the reply message descriptor, the originating processor can obtain the information provided by the message.

Figure 3A:
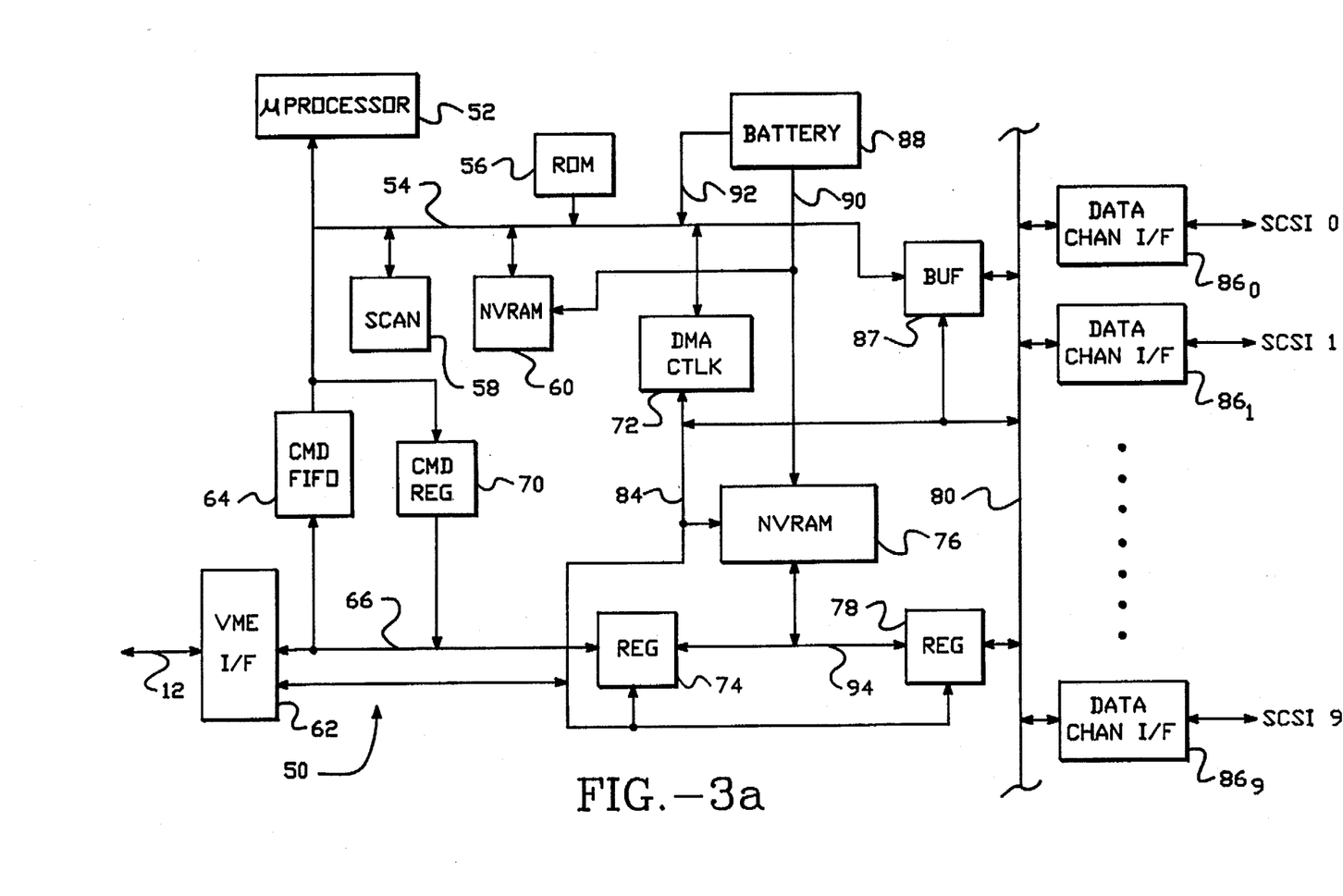
FIG. 3a is a detailed block diagram of a preferred embodiment of the storage processor sub-system constructed in accordance with the present invention.

A detailed block diagram of a storage processor 50, constructed in accordance with the preferred embodiment of the present invention, is shown in FIG. 3a. A microprocessor 52 directs the overall operation of the storage processor 50. The microprocessor 52 is coupled to a local processor bus 54 with attached ROM 56, static RAM 58, and non-volatile RAM 60 units. The ROM 56 preferably contains an executable program sufficient to allow the microprocessor 52 to boot and load an image copy of the host operating system to the host processor 32 and, subsequently, to receive via the host processor 32 an executable image of a control program to be independently executed by the microprocessor 52 to establish cooperative operation among the processors 32, 36, 38, and 46. This executable image is loaded in and executed from the static RAM array 58. The static RAM array 58 also is utilized to store working program variables and control structures including, for purposes of the present invention, an active queue of data transfer requests. The non-volatile RAM unit 60 is utilized to maintain two significant control structures: a non-volatile control structure, nvcntl, as defined in Table 1:

TABLE 1

Non-volatile control structure:

```
struct nvcntl {
    int     magic;
    int     cache_page_cnt;
    char    disk_serial_no[MAX_DRIVES] [12];
    int     check_sum;
}
``` and an array of nvbuf control structures, where each is defined in accordance with Table 2:

TABLE 2

Non-volatile data buffer control structure:

```
struct nvbuf {
    int     sequence_no;
    int     sector;
    short   sector_count;
    u_char  disk_number [Max_No_Drives] [12];
    u_char  state;
    int     check_sum;
}
```

Only a single nvcntl control structure is maintained. However, the number of nvbuf control structures is defined, in the preferred embodiment of the present invention, by the number of cache pages that can be simultaneously allocated for use by the storage processor 50.

Figure 3B:
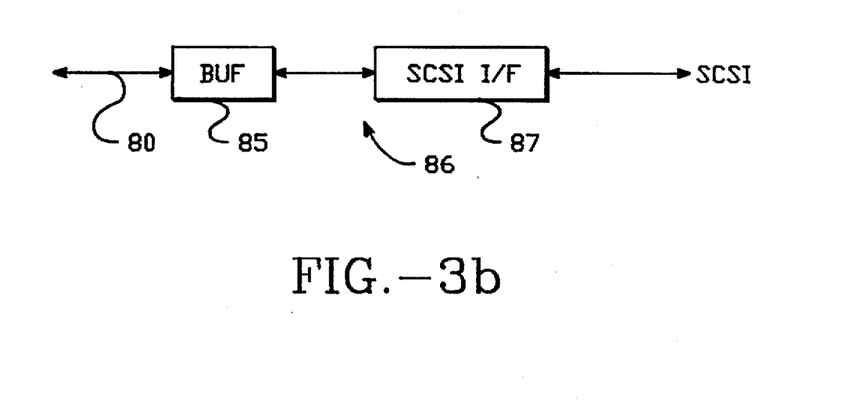
FIG. 3b is a simplified block diagram of a data channel interface unit in accordance with the preferred embodiment of the present invention.

Also connected to the local bus 54 are a command FIFO 64, utilized for receiving message descriptors, a command register 70, utilized for sending message descriptors, and a data buffer 82 used for sending and receiving messages. The command FIFO 64 and command register 70 are both coupled to an internal data bus 66 that connects through a VME interface unit 62 to the bus 12. The internal data bus 66 also connects through a bi-directional register 74, intermediate data bus 94, second bi-directional register 78, a secondary data bus 80 and finally to the data buffer 82. Also connected to the secondary data bus 80 is an array of, in the preferred embodiment of the present invention, ten data channel interface units, $86_0$ through $86_9$. As shown in FIG. 3b, each data channel interface unit 86 includes a data buffer 85 provided between the secondary data bus 80 and a SCSI interface controller 87 capable of autonomous operation at least for the transfer of data between a SCSI peripheral and the data buffer 85.

Finally, a battery status indication signal is provided essentially from the battery 88 to the local bus 54 to allow status monitoring by the microprocessor 52.

In support of the microprocessor 52, an autonomously operating DMA controller 72 is provided to control the DMA burst transfer of data between the VME interface unit 62, the data buffers 85 of the data channel interface units 86, the data buffer 82 and, finally, a non-volatile cache memory 76. This non-volatile cache memory 76 is coupled to the intermediate data bus 94 for the bi-directional transfer of write cache data.

The DMA controller 72 generates a variety control and address signals on the control bus 84 to select, initiate, and direct the operation of burst data transfers. In accordance with the preferred embodiment of the present invention, each burst transfer consists of 128 bytes. Cache data writes from the VME interface unit 62 are passed by the register 74 to the non-volatile cache memory 76 for storage at an address provided by the DMA controller 72 via the address lines portion of the control bus 84. Similarly, the DMA controller 72 controls DMA burst transfers of write data from the non-volatile cache memory 76 through the bi-directional register 78 to the buffer 85 of one or more of the data channel interface units 86. Thus, an optimized, readily reconfigurable data path is established to closely integrate the non-volatile memory array 76 with the balance of the storage processor 50.

However, in accordance with the teachings of the present invention, a storage processor 50 itself may be subject to failure. Thus, the non-volatile memory unit 60 and non-volatile cache memory 76 are preferably implemented on a daughtercard detachable from the remainder of the storage processor 50. Indeed, the storage processor 50 is quite capable of continued operation, albeit without write data caching capability, in the absence of the non-volatile RAM unit 60 and non-volatile cache memory 76.

Figure 3C:
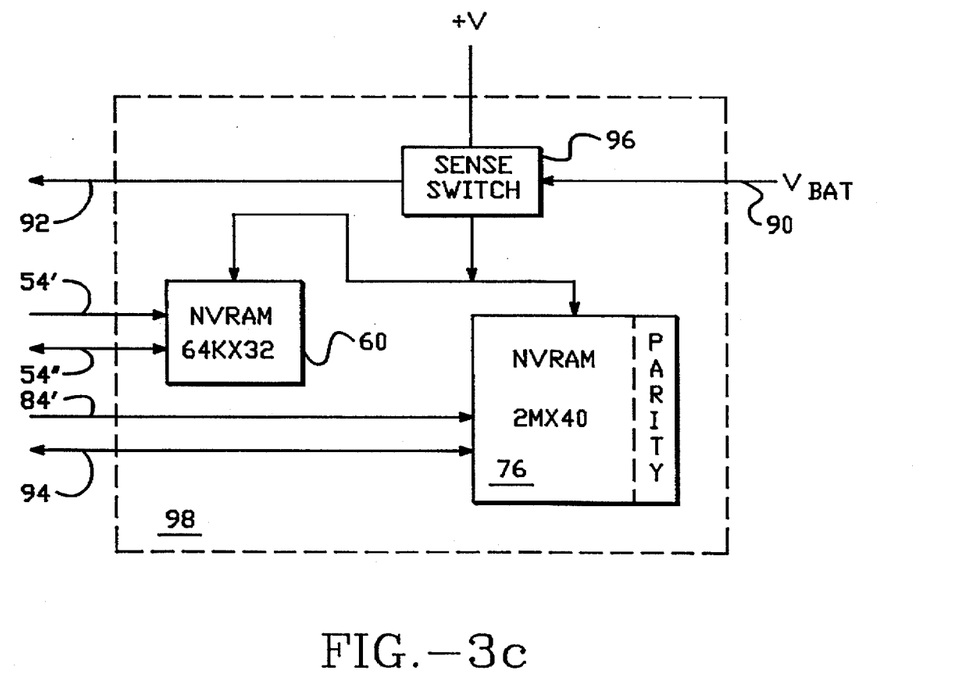
FIG. 3c is a simplified block diagram of the preferred daughtercard implementation of the removable non-volatile memory array with attached battery backup capability as constructed in accordance with the present invention.

As shown in FIG. 3c, a daughtercard unit 98 carries the non-volatile RAM unit 60 and non-volatile cache memory 76 in their entireties. Address lines 54', 84' and data lines 54", 94 extend off the daughtercard 98 to allow interconnection to the balance of the storage processor 50. Also included on the daughtercard 98 is a sense switch unit 96 that performs the power switching function from standard system power V+ to the battery backup power source 90 $V_{BAT}$. The sense switch 96 also performs the function of sensing the system power status and a low battery condition and providing corresponding signals on the control lines 92.

The value of the present invention is best illustrated when considering operation in support of NFS write operations. In a conventional computer system without write caching, an NFS write operation typically requires an average of 30 milliseconds to complete, since the write must physically complete to the disk. Due to the stateless design of NFS, data writes are required to be synchronous with the disk subsystem. That is, the write must complete fully to disk prior to acknowledgment of the write data transfer; the process initiating the NFS write request remains blocked until the acknowledgement is received.

A comparable NFS write operation utilizing the non-volatile cache memory 76, in accordance with the present invention, permits an NFS write to complete in less than about one millisecond. The synchronous NFS write protocol is not violated since the acknowledgment of the write is not returned until the data is safely stored in the non-volatile cache memory. Naturally the integrity of such data must be insured until ultimately written to disk.

On a loaded system the disparity between cached and un-cached NFS writes increases with load. A typical NFS client will employ a number of basic I/O daemons (BIODs) in order to manage multiple concurrent NFS operations. A typical delay of an NFS write operation over an Ethernet network is on the order of about 42 milliseconds: 7 milliseconds for Ethernet transport, 3.5 milliseconds for network protocol processing, 1.5 milliseconds for file system processing and 30 milliseconds for disk accessing and data return.

A single NFS write operation results in one to four, typically two to three, synchronous writes being required for inode and data accesses and updates. These accesses are typically sequential and therefore time cumulative. Even where a large number of NFS write data blocks are transferred in fast succession over the network, and even with the typical case of four BIODs to allow parallel execution of NFS data write operations, the initial four resulting NFS writes will still take on the order of about 140 milliseconds, since the client has to wait until the last write is completed and acknowledged.

With the write cache of the present invention, fast successive data write operations can be completed to the non-volatile cache memory with a total comparable elapsed time of about 40 milliseconds or less. The present invention further takes advantage of the opportunity presented by maintaining write data in the non-volatile cache memory to substantially optimize the subsequently required data transfer operations to the physical disk system. Particularly in the case of the UNIX operating system, the UFS will tend to write the inode and related indirect blocks repeatedly while writing file data sequentially. The present invention optimizes the data present in the non-volatile cache memory by discarding effectively overwritten blocks and by coalescing sequential data blocks for transfer in a single continuous write operation. The overwriting and coalescing of blocks within the non-volatile cache memory 76 directly eliminates and significantly optimizes the number and nature of physical disk transfer operations necessary for transferring the write cached data to disk.

In accordance with the present invention, the length of time that write data remains in the non-volatile cache memory is proportional to the data transfer loading of the storage processor 50. That is, cache writes generally remain in the non-volatile cache memory 76 for so long as read and uncached write data transfer operations are being continuously performed. However, the degree of optimization obtainable through maintenance of delayed write data in the non-volatile cache memory 76 increases with the amount of time that the write data is delayed. Thus, optimization of the write data operations of the storage processor 50 tends to increase, at least in partial compensation, with increasing or continuing read and uncached write data transfer activity.

Figure 4:
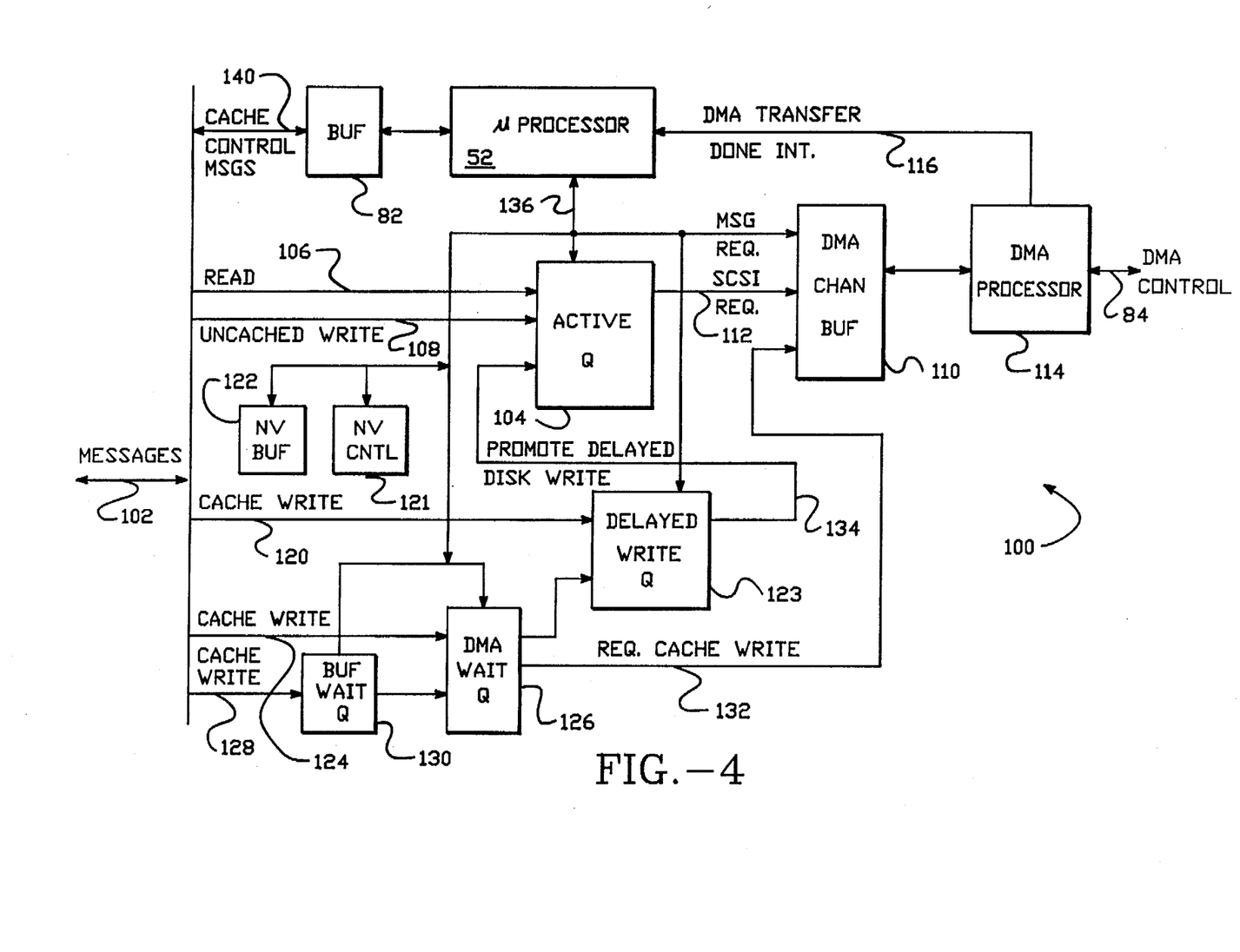
FIG. 4 is a schematic representation of the software controlling data structures and related hardware as implemented in a preferred embodiment of the present invention.

A simplified block diagram of the major data structures and supporting hardware involved in data transfer operations through the storage processor 50 are illustrated in FIG. 4. The system 100 generally describes the operation of the storage processor 50 in response to messages received at 102 and, ultimately, the generation of DMA control signals for the control of a block data transfer on the control lines 84. This process is managed by the microprocessor 52 through the use of an active request queue 104 formed as a control structure preferably within the SRAM unit 58 of the storage processor 50, a nvcntl control structure 121 formed within the non-volatile RAM unit 60, a nvbuf array control structure 122 also formed within the non-volatile RAM unit 60, and a delayed write queue 123, DMA wait queue 126 and buffer wait queue 130, all of which are formed as control structures in the SRAM unit 58. Finally, an array of cache page, each preferably consisting of an 8192 byte data page, are formed at fixed consecutive locations within the non-volatile cache memory 76.

By their construction in the SRAM unit 58 and non-volatile RAM unit 60, the active queue 104, delayed write queue 123, DMA wait queue 126, buffer wait queue 130, non-volatile control structure 121 and non-volatile buffer array 122 are directly accessible by the microprocessor 52 as represented by the data control access paths 136. Thus, the microprocessor 52 can directly implement the transfers of data and control information among these structures. In addition, the microprocessor has data and control access to a DMA channel buffer 110 utilized for communicating with a DMA processor 114. Together, the DMA channel buffer 110 and DMA processor 114 form the DMA controller 72 as shown in FIG. 3a. The high-speed DMA controller and its operation are disclosed and discussed in detail in the co-pending related application, HIGH SPEED, FLEXIBLE SOURCE/DESTINATION DATA BURST DIRECT MEMORY ACCESS CONTROLLER, which application is expressly incorporated by reference herein.

The DMA channel buffer 110 is, preferably, a dual ported memory utilized to store an array of channel operation control structures. Each of these channel operation control structures are identically formatted to define for the DMA processor 114 a respective data transfer operation. In the preferred embodiment of the present invention, there are twelve significant DMA channels. Ten of these channels correspond to the ten SCSI data channel interface units. Another channel is used for controlling the transfer of cache write data from the VME interface unit 62 to the non-volatile cache memory 76. The twelfth DMA channel controls the transfer of a message between the VME interface unit 62 and the data buffer 82.

The DMA processor 114 operates as an autonomous state machine perpetually scanning the DMA channel buffer 110 and initiating DMA channel operations for each of the DMA channel control structures found ready. Since the DMA processor 114 can direct a high-speed transfer of a 128 byte block of data between data sources and destinations, a speed significantly faster than the SCSI interface controller 87 can transfer data between its associated buffer 85 an a SCSI peripheral, the DMA processor 114 can effectively interleave multiple data transfer operations as a consequence of its cyclic re-evaluation of the DMA channel control buffer 110. Once the DMA processor 114 has completed the entire data transfer specified by a channel control structure for a corresponding DMA channel, the DMA transfer done interrupt is provided to the microprocessor 52 via channel interrupt lines 116. The microprocessor 52, effectively as part of the interrupt service routine then reevaluates the contents of the request queues and control structures 104, 123, 126, 130, 121, 122 to determining whether another data transfer request is pending for the freed DMA transfer channel. If a candidate request is identified, the microprocessor 52 processes from the request entry the necessary control information to complete the DMA control structure within the DMA channel buffer 110. Once the new DMA control structure has been constructed, a flag is set in the DMA control structure to signal the DMA processor 114 on its next cyclic pass to consider this new DMA control structure for initiation of a corresponding channel DMA transfer.

The nvcntl control structure 121 contains a single instance of the nvcntl structure shown in Table 1. The variable magic is set to a predetermined value, preferably FF0055AA hex, to indicate that the non-volatile RAM unit 60 and non-volatile cache 76 have been initialized and valid write data may be stored. Any other value is considered to indicate that the non-volatile RAM unit 60 and cache memory 76 are not initialized. The variable cache_page_cnt specifies a size of the non-volatile cache memory 76 by an integer count of fixed 8KByte cache pages that are available for use. The array variable disk_serial_no is utilized to store disk drive serial numbers for all disk drives attached to the storage processor 50. In the preferred embodiment of the present invention, each disk drive is electronically serialized with a unique number identifying the particular disk drive unit. Finally, the check_sum variable holds a conventionally calculated checksum value for the nvcntl control structure. Recalculation of the checksum value allows the processor 52 to check the data integrity of the nvcntl control structure 121.

The nvbuf control buffer array 122 contains an array of nvbuf structures having a one to one correspondence with the cache pages present in the non-volatile cache memory 76. The data maintained in each nvbuf data structure is sufficient to reconstruct a corresponding delayed write queue entry upon evaluation by the microprocessor 52 following a restart of the operating system. Specifically, the sequence_no variable maintains the count value ordering of cache data write requests. The order of cache page allocation, and therefore of the corresponding requests, is necessarily important in restoring the order of any repeated or overlapping data writes that may be pending in the reconstructed delayed write queue 123. On the rare occurrence that the microprocessor 52 wraps the sequence number from 2*32-1 to 0, the microprocessor 52 will adjust the sequence numbers present in all of the valid nvbuf control structures in order to insure at least a monotonic ascending order of sequence numbers at all times. The variables disk_number, sector and sector_count directly identify the disk and contiguous sequence of logical disk sectors that are to ultimately receive the cache write data. In effect, the disk number identifies the DMA channel and data channel interface unit 86 that will be utilized for the eventual cache data transfer to the disks 40. The state variable is a flag value essentially identifying whether the corresponding cache page contains valid data or is free for reuse. Finally, the check_sum variable is used to hold a conventionally calculated checksum value corresponding to the data within a specific, corresponding instance of a nvbuf control structure. This checksum value is used to protect the data integrity of its nvbuf control structure, particularly where there is a system failure while a specific nvbuf control structure is being modified. In this case, only the write data associated with the nvbuf control structure whose modification failed to complete, as indicated by a failed checksum compare, is deemed corrupted. Thus, the loss of write data integrity is minimized to a specific cache page. Naturally, should a comparison of the stored and recalculated check sum values for the nvcntl control structure 121 fail, then the integrity of the entire write cache is challenged. In the preferred embodiment of the present invention, this challenge is resolved by simply purging and completely reinitializing the NVRAM unit 60 and non-volatile cache memory 76.

The storage processor 50 maintains the non-volatile cache memory 76 in one of five states: un-initialized, off, dirty, on, and bad-checksum. The default state of the non-volatile cache memory 76 at power up is un-initialized. Consequently, there is no caching of data writes until a subsequent series of messages are received by the microprocessor 52 (initialize NVRAM and enable NVRAM) directing the microprocessor 52 to place the non-volatile cache memory 76 into an on state.

The cache control messages that can be received by the microprocessor 52 for the management of the non-volatile cache memory 76 parallel the commands issuable at the system administrator user interface for control of the non-volatile cache memory 76. The management messages include Initialize NVRAM, Enable NVRAM, Disable NVRAM, Purge Data and Flush Data. The Initialize NVRAM message is normally issued during the automatic system configuration operation following from the execution of rc.boot. On receipt of the initialize NVRAM message via the buffer 82, the microprocessor 52 examines the value of the magic variable in the nvcntl control structure 121. If the value is not set to the predetermined magic value, the nvcntl and array of nvbuf control structures 121,122 are re-initialized or initialized for the first time, a log message may be issued through to the system console, and the state of the non-volatile cache memory 76 is set to off. If the magic value is proper, the nvcntl control checksum is verified. If the verification fails, all of the control structures 121, 122 and any valid cache pages are considered corrupt. The state of the non-volatile cache memory 76 is therefore set to bad-checksum. A purge of the control structures is required to change the state of the non-volatile cache memory 76 to off. If the checksum, however, is verified as correct, each of the nvbuf control structures are scanned to determine if there is any unwritten cache data present in the cache pages. If an nvbuf control structure is marked valid, but fails in a corresponding checksum verification, the integrity of the non-volatile memory is considered to have failed and the non-volatile cache memory 76 is placed in a bad-checksum state. However, for each valid and checksum verified nvbuf control structure, the microprocessor 52 will then verify the disk serial number in the nvcntl control structure 121 with the actual disk drive serial numbers as read from the disks. Where proper matches are found and valid cache pages are present, the microprocessor 52 then initiates a write of the cache page data to a corresponding disk drive. If the disk serial number verification or any cache page write attempt fails, the non-volatile cache memory 76 is set to a dirty state. If the disk serial number verification fails, but no valid cache pages are present, the serial numbers in the nvcntl control structure are updated (auto-reconfiguration). Where a cache page write attempt failure is correctable by the system administrator, typically through the mapping of a bad sector, a subsequent write operation, initiated in response to a system administrator user level flush command, and in turn Flush Data message, may then complete correctly. Once all valid cache pages successfully written to disk, the non-volatile cache memory 76 is placed in an off state. Finally, the state of the non-volatile cache memory is returned in response to the initialize NVRAM message.

The Enable NVRAM message directs the microprocessor 52 to enable the non-volatile cache memory write cache function and to set the state to on. This message is only accepted when the current state of non-volatile cache memory 76 is off.

The Disable NVRAM message directs the microprocessor 52 to disable the non-volatile cache memory write cache function. First all unwritten cache pages are flushed to the disks 40. Depending on whether the flush cache write was entirely successful, the state of the non-volatile cache memory is set to off (successful) or dirty (a flush write failed). Again, the completion status of the message is returned in the message reply to the disable NVRAM message.

The Purge Data message directs the microprocessor to purge all unwritten cache pages from the non-volatile cache memory 76 and reinitialize all of the non-volatile control structures 121, 122 and cache pages. The state of non-volatile cache memory 76 is then set to off.

Finally, the Flush Data message forces a write of cache data from the non-volatile cache memory 76 to the disk 40. This command will be accepted whenever the state of the non-volatile cache memory is dirty or on. Consequently, the flush data message is typically used to flush out unwritten cache data after a disk media error, such as a bad sector, has been remapped. On a successful flush cache write, the state is changed to off. Otherwise the state remains set to dirty.

Three additional messages may be sent to the storage processor 50 to direct the actual transfer of data. These messages include a Write Data message, a NV Write Data message and a Read Data message. The Write Data message requests an uncached write of data to be transferred from the VME interface unit 62 directly to the disks 40. This message, like all messages, is actually transferred to the buffer 82 for processing by the microprocessor 52. In turn, a corresponding entry is made in the active queue 104; this sequence of steps is logically shown by the line 108. In the preferred embodiment of the present invention, the active queue 104 operates as an elevator queue sorted by first by DMA channel and then sector. That is, the insertion of the uncached write requests into the active queue 104 is performed to maintain an order first based on disk_number, permuted as necessary by the number of parallel SCSI channels used for disk drives, and then based on sector. Thus, the active queue 104 effectively operates as multiple elevator queues, rather than as a single or even multiple first-in, first-out queues, with each of the elevator queues queuing data transfer requests for a corresponding DMA channel.

Each entry in the active queue 104 contains sufficient information to construct a corresponding DMA channel control structure that can then be transferred, generally as indicated by the line 112, by the microprocessor 52 to the DMA channel buffer 110.

On receipt of a DMA transfer done interrupt corresponding to an uncached write operation present in the active queue 104, the microprocessor 52 initiates the return of an acknowledgement reply message, deletes the uncached write entry from the active queue 104 and, finally, promotes the next sequential active queue request for the freed DMA channel to the DMA channel buffer 110.

The Read Data message is treated in a manner substantially similar to that of the uncached Write Data message. The Read Data message results in an entry being made in the appropriate elevator queue of the active queue 104, generally as indicated by the line 106. Eventually, the read data is obtained through the operation of the DMA processor 114 and simultaneously stored via the VME interface unit 62 in main memory 34. A reply to the Read Data message is then issued by the microprocessor 52. The entry in the active queue corresponding to the read data message is then deleted.

Finally, the NV Write Data message is treated by the microprocessor 52 as a directive to perform a data write operation to the non-volatile cache memory 76. An entry corresponding to the NV write message is made into the delayed write queue 123, generally as indicated by the line 120. Depending on whether cache pages in the non-volatile cache memory 76 are immediately available, an entry is made into the DMA waiting queue 126 (cache pages available), as generally as indicated by the cache write line 124, or into the buffer waiting queue 130 (all cache pages presently in use), generally as indicated by the line 128.

The entry in the delayed write queue 123 is substantially equivalent to an uncached write entry. The entry in the DMA waiting queue 126 for a cache write contains information sufficient to construct a DMA channel control structure for the DMA channel buffer 110. The microprocessor 52 operates the DMA waiting queue 126 as a first-in, first-out queue in selecting an entry for promotion to the DMA channel buffer 110. On completion of the DMA transfer from the VME interface unit 62 to the non-volatile cache memory 76, the entry in the DMA waiting queue 126 is deleted, the corresponding entries in the delayed write queue 123 and nvbuf control structure 122 are updated to reflect the identity and validity of the cache pages holding the write data. An acknowledgement reply message can then be issued.

In general, whenever the active queue 104 is empty, the microprocessor 52 examines the delayed write queue 123 to select an entry for promotion to the active queue 104. In general the entry defining the largest single data transfer that can be made from the non-volatile cache memory 76 to the disks 40 is selected for promotion to the active queue 104. Once this data is transferred to the disks successfully, the corresponding cache pages are marked as free by the microprocessor 52. The buffer waiting queue 130 is then examined and the oldest queue entry, if any, is promoted to the DMA waiting queue 126. The corresponding entry in the buffer waiting queue 130 is deleted, while the newly made entry in the DMA waiting queue 126, is processed as though directly provided to the DMA waiting queue 126 as described above.

Finally, a number of messages can be provided to the microprocessor 52 to obtain information regarding the state, condition, and performance of the non-volatile cache memory 76. A first message, Read Dirty List or State message, obtains a reply message from the microprocessor 52 giving the current state of the non-volatile cache memory 76 or a list of dirty cache pages, including the sector, sector count, disk number and state of each dirty cache page. Selection between a state or dirty page list reply is established by a flag byte provided in the Read Dirty List or State message as provided to the microprocessor 52.

A NVRAM Status message, preferably issued by a host processor 32 executed status monitor daemon (statd) on a periodic basis, directs the microprocessor 52 to prepare a reply message specifying the number of cache pages used, number of messages waiting for cache, and number of messages waiting for DMA hardware. Also returned is the average waiting time for write data managed through the delayed write queue 123 as well as the total number of non-volatile cache memory writes, coalesced writes, and exact and inexact overlapping writes handled through the non-volatile cache memory 76.

A number of write cache protections as well as performance optimizations are performed by the microprocessor 52 in the management of all read and write data messages and data transfers through the storage processor 50. Since the ordering of successive read and write operations must be maintained, a sequence number is assigned by the microprocessor 52 to all cache write messages in the order received and the ordering of read and uncached write messages is checked and managed on receipt.

In the case of a NV Write Data message, the microprocessor 52 enters the message in the delayed write queue 123 as soon as it is received and independent of the timing of the actual write data transfer to cache pages. This allows the microprocessor 52 to immediately scan for and identify subsequent read and write messages with overlapping sector addresses. An acknowledgment reply message is issued by the microprocessor 52 as soon as the data defined by an NV Write Data message has been transferred to cache pages in the non-volatile cache memory 76. Thus, it is highly likely that another overlapping or contiguous write data block will be received, transferred to the non-volatile cache memory 76 and acknowledged before the overlapped or prior contiguous data has been written out to the disks 40. Thus, there is an opportunity to optimize the subsequent disk write operation by coalescing these two or more overlapping or continuous data blocks. In the instance of a Read Data message, it is necessary for the microprocessor 52 to scan the delayed write queue 123 immediately on receipt to determine if any overlapping NV Write Data message, either awaiting data or having data fully present in the non-volatile cache memory 76, are present. In accordance with the present invention, an NV Write Data message overlapped by a subsequent Read Data message is immediately promoted to the active queue 104. The Read Data message is also inserted in the active queue 104, though behind the promoted NV Write Data message so as to execute subsequently. If the sequence order of such a write and read sequence is not so respected, the read operation may properly complete, though returning improper data.

NV Write Data messages, in the preferred embodiment of the present invention, are limited to single 8K byte data transfers that are aligned on 8K page boundaries the default size and character of NFS data write requests. NV Write Data messages that do not conform to these criteria are treated as uncached Write Data messages in the preferred embodiment of the present invention. While these restrictions could be alleviated through the use of a dynamic storage allocation algorithm for controlling the placement of cache pages within the non-volatile cache memory 76, the need for such additional complexities is not generally to be found necessary where NFS server use is the predominate operation.

For NV Write Data messages that conform to the above criteria, a cache page is allocated in the non-volatile cache memory 76. If a cache page cannot be allocated, the message is effectively inserted into the buffer waiting queue 130. Every time that the microprocessor 52 frees a cache page, the buffer waiting queue 130 is scanned. When a cache page becomes available, either upon initial receipt of an NV Write Data message or after a cache page has been freed, the NV Write Data message is inserted to the DMA waiting queue 126. If the DMA waiting queue 126 is otherwise empty, the DMA channel for controlling NV cache memory writes is immediately available. The DMA control structure is then built in the DMA channel buffer control structure for non-volatile cache memory writes. The DMA waiting queue is reevaluated by the microprocessor 52 each time the DMA processor 114 issues a DMA transfer done interrupt corresponding to the non-volatile cache memory DMA channel.

When all data for an NV Write Data message has been transferred to cache pages, the corresponding instances of the nvbuf control structures is updated for the corresponding cache pages. An acknowledgement reply message is then issued by the microprocessor 52. This insures that the write data is properly and fully stored within the non-volatile cache memory and thereby protected in the event of a system shutdown prior to a further transfer to the disks 40.

In accordance with the present invention, a flag is associated with each of the entries in the delayed write queue 123 to signify whether the data corresponding to each of the messages has been fully fetched to cache pages. This flag must be updated prior to the corresponding write acknowledgement reply message being issued by the microprocessor 52 if synchronous writes are to be correctly handled. That is, the flag is updated in connection with completion of the data transfer request pending at the top of queue in the DMA waiting queue 126. Completion is signified by issuance of the DMA transfer done interrupt corresponding to the non-volatile cache memory DMA channel. The entry in the DMA waiting queue 126 corresponding to the NV Write Data message is deleted following update of the nvbuf control structure 122 and prior to the issuance of the cache write acknowledge reply message by the microprocessor 52. Specifically, the acknowledgement reply message, like all reply messages where a non-trivial reply is to be sent, is first formed in the buffer 82. The microprocessor 52 then constructs a DMA channel control structure in the DMA channel buffer 110 for the DMA buffer 82 to VME interface unit 62 DMA transfer channel. For trivial replies, a null reply message descriptor is written to the originating processor's command FIFO via the command register 70. In both cases, the microprocessor 52 is then free to return to processing the entries in the delayed write queue 123.

Continuous data block writes are coalesced so as to be serviced by a single disk request spanning multiple cache pages. Repeated data blocks are identified and the earlier sequence numbered instances are deleted. That is, the delayed write queue 123 is searched to determine first whether there are overlapping write requests. When an overlapping write is found, the overlap is determined to be either exact or inexact. The exact overlap means that two write data requests exactly reference (address) the same sectors of the same disk. In such case, the first write request is simply discarded and the corresponding cache pages are freed. In order to insure that the subsequent data write can ultimately be made to disk, the earlier data write cache page is not freed until the subsequent data write block has fetch completed and is present in another cache page, and then only if transfer of the prior data block to a data channel interface unit 86 has not yet started.

An inexact overlap means that two writes overlap only by a portion of their addressed sectors. In the preferred embodiment of the present invention, the first write is immediately promoted from the delayed write queue 123 to the active queue 104. This immediate move insures that the first write will result in a data transfer to disk before the subsequent overlapping write is transferred to disk. In the event that the system is restarted prior to the writing of at least the first inexact write to disk, there will be two cache pages identified in the nvbuf control structures 122. Both the active queue and delayed write queue 104, 123 will be lost as a consequence of the system restart. However, the sequence number variable present in each of the nvbuf control structure can be utilized by the microprocessor 52 in the reconstruction of the delayed write queue 123 and the identification of the earlier of the two overlapping cache pages. An entry corresponding to the earlier of the two overlapping cached pages can be reconstructed directly in the active queue 104 while a message entry for the subsequent cache page is entered in the delay write queue 123.

When two message entries are present in the active queue 104 with same disk and overlapping sector addresses, they are served in a first-in, first-out order. Consequently, the two messages will be served in their proper order and thereby preserve disk data integrity.

Whenever the microprocessor 52 detects that the active queue 104 is empty, the delayed write queue 123 is searched to find the NV Write Data message that defines a write data transfer to the largest number of sectors. This algorithm results in giving the highest priority to coalesced writes and to freeing the largest number of cache pages as soon as possible. This algorithm also recognizes that, particularly in the UNIX file system, the writing of data blocks is typically sequential while the writing of inodes and indirect blocks are typically repetitive. The sequential, coalesced writes, representing large blocks of consecutive sectors will be written out to disk at higher priority. Conversely, the smaller sector write blocks will have a substantially higher proportion of inode and indirect block writes and, therefore, be subject to a higher rate of discard because of repetitive writes. Further, as is also typical with the UNIX file system, data writes typically cluster, thereby resulting in a greater likelihood of data coalescing where the active queue 104 remains not empty for greater durations of time. Thus, the delayed write control algorithms of the present invention tend to remain optimized under nearly all loading conditions.

Another circumstance that must be considered is where a NV Write Data message has been promoted to the active queue 104 and is ready for processing by the DMA processor 114 prior to completion of the data fetch into the cache pages. In this instance, the microprocessor 52 will hold off enabling that the corresponding SCSI data channel interface unit 86 until the data fetch has completed. That is, the SCSI data transfer will be initiated by the microprocessor 52 in response to receipt of the DMA transfer done interrupt corresponding to this SCSI channel.

Another circumstance that must be handled involves the utilization of mirrored write data disk drives. In accordance with the preferred embodiment of the present invention, a mirrored write generates, through the operation of the UFS and device driver, two parallel disk write messages. Two separate cache pages are therefore allocated and separately fetched. The further processing necessary to manage the presence of multiple non-volatile write messages in the delayed write queue 123 is independent of the fact that two disk writes are directed to mirrored drives. Thus, no special instructions are needed to manage such cache pages, since each cache page is written to a respective disk.

A final circumstance involving NV Write Data messages occurs when there is a disk or media failure resulting in a NV Write Data message being held in the delayed write queue 123, or even active queue 104, and the corresponding cache pages persisting in non-volatile cache memory 76. Since the cache page data write to disk failed, the cache pages are not freed and the data is preserved. However, the corresponding nvbuf control structures 122 are marked as dirty and subsequent cache function is disabled by the microprocessor 52. Preferably, a error log message is issued by the microprocessor 52 through to ultimately the system console to inform the system administrator. This allows manual intervention to attempt a fix of the disk hardware or media failure. If the failure can be fixed, a flush message can be directed to the microprocessor 52 by the system administrator resulting potentially in a proper write of the cache page data to disk and a resetting of the status from dirty to off. The system administrator can then issue an NVRAM enable signal to cause a resumption of NV write messages.

A further complication is where an NV write and overlapping read have been properly moved to the active queue 104, but the write data transfer fails. The corresponding entry in the nvbuf control structures 122 is, as before marked dirty. In accordance with the preferred embodiment of the present invention, the overlapping read request has a media error reply message return by the microprocessor 52 and the dirty NV Write Data message is moved back to the delay write queue 123. Thus, subsequent requests to the same disk and DMA channel may be processed through the active queue 104 while the dirty NV Write Data request is maintained in the delayed write queue 123 for comparison against subsequent reads and writes. A subsequent write request overlapping a dirty NV Write Data request already present in the delayed write queue 123 is not processed through the non-volatile cache memory 76 as the caching functionality was disabled on the occurrence of a dirty write. Rather, the request is allowed to process through the active queue 104 in an attempt to write to the disk. Regardless of whether this subsequent request is successful, the dirty write request in the delayed write queue 123 is immediately removed as obsolete. If there is a failure, a media error reply message is returned by the microprocessor 52 and the subsequent request is deleted. Where there is an overlapping read following a dirty NV write, a media error reply message is immediately returned by the microprocessor 52. Thus, the delayed write queue 123 continues to be used in managing and maintaining data integrity in the presence of a media or hardware error. That is, subsequent reads and writes overlapping a dirty NV write block will be identified by the microprocessor 52 through a search of the delayed write queue 123 with appropriate action being taken to maintain the cached data unless and until invalidated by subsequent overlapping write or a purging of the non-volatile cache memory 76 under the direction of the system administrator.

Thus, a comprehensive high performance write cache acceleration system has been described. This system provides the capability of providing write caching for an array of high performance data channels, resulting in a substantially increased potential complexity yet maintaining an efficient design and optimum performance under widely varying data transfer loads.

Naturally, many modifications and variations of the present invention are possible in light of the above teaching it is therefore to be understood that, within the scope of the appended claims, as issued, the invention may be practiced otherwise than is specifically described above.

We claim:

1. A data storage system coupleable through an interface to a host computer system to permit the exchange of data between said data storage system and said host computer system, said data storage system comprising:

a) a plurality of data storage devices;
  b) a plurality of data transfer channels, each said data storage channel being coupled to a respective one of said data storage devices, each data transfer channel including a data buffer and means for autonomously controlling the transfer of data between said data buffer and said respective one of said data storage devices;
  c) memory means for non-volatile random access storage of data;
  d) interface means for transferring data;
  e) data means for providing selective data transfer couplings between said data transfer channels, said memory means, and said interface means; and
  f) control means, coupled to said data means, for directing the selective transfer of data between said data transfer channels, said memory means, and said interface means, said control means including direct memory access control means, responsive to said control means, for burst transferring data between said interface means and said data buffers, between said interface means and said memory means and between said memory means and said data buffers.

2. The data storage system of claim 1 wherein said memory means stores a plurality of cache pages of data destined for storage by respective ones of said data storage devices, said data storage system further comprising control memory means for non-volatile random access storage of control data including status and destination data for each of said cache pages of data, and wherein said control means directs the selective transfer of data between said data transfer channels in response to said control data.

3. The data storage system of claim 2 wherein the status of said cache pages of data includes free and in-use status data, wherein said control means directs the selective transfer of data from said interface to a predetermined first cache page, and wherein said control means is coupled to said control memory means to enable said control means to concurrently access the status data corresponding to a predetermined second cache page.

4. The data storage system of claim 3 wherein said control means provides for the storage of said plurality of cached pages of data in a write data queue, wherein said control means provides for the initialization of said direct memory access means to transfer the data stored by a predetermined one of said cache pages of data in said write data queue to a predetermined one of said data buffers, and wherein said control means operates to reduce and restructure the contents of said cache pages of data within said write data queue by removing duplicate data and re-ordering the remaining ones of said cached pages of data in said write data queue.

5. The data storage system of claim 4 wherein said control means further provides for the transfer of data from said buffers to said interface means without passing through said memory means, said control means also providing for coherency control over read data requests received by said control means by directing the selective transfer of data between said memory means rather than from said data transfer channels.

6. The data storage system of claim 5 wherein said data storage system is subject to application of power, wherein said control means further provides for the search of said memory means for cached pages of data on said application of power, wherein said control means provides for the transfer of a found cached page of data to a predetermined one of said plurality of said data channels, said control means being responsive to said control data corresponding to said found cached page of data.

7. The data storage system of claim 1 wherein predetermined write data, representing a network originated data file transfer, is received through said interface means pursuant to a predetermined write request message received by said control means, and wherein said control means originates a write acknowledgement message on committing said predetermined write data to said memory means, whereby the latency of said data storage system in originating said predetermined write acknowledgement message is reduced.

8. The data storage system of claim 7 wherein said predetermined write data, represents a network file system (NFS) originated data file transfer.

9. A data storage system that is coupleable between a plurality of non-volatile data storage devices and a host computer system to manage the exchange of data between said plurality of non-volatile data storage devices and said host computer system, said data storage system comprising:

a) a plurality of data transfer channels coupleable respectively to said data storage devices, each said data transfer channel including:
    i) a channel buffer; and
    ii) a channel controller that, with respect to said host computer system, autonomously controls the transfer of data between a respective pair of said channel buffers and said non-volatile data storage devices;
  b) a non-volatile random access memory for storing control information and cache page data, said control information corresponding to said cache page data;

c) an interface for coupling said data storage system with said host computer system;

d) a data bus permitting selective transfer of said cache page data between said data transfer channels, said non-volatile random access memory, and said interface; and e) a controller, coupled to said data bus, that directs the selective transfer of said cache page data through said interface, said non-volatile random access memory, and said data transfer channels, said controller including a direct memory access controller that manages burst transfers of predetermined cache page data between said non-volatile random access memory and said channel buffers, said controller maintaining said predetermined cache page data and corresponding said control information until the transfer of said predetermined cache page data to said non-volatile data storage devices until the transfer is complete.

10. The data storage system of claim 9 wherein said non-volatile random access memory stores a plurality of cache pages of data destined for storage by respective ones of said data storage devices, said data storage system further comprising a non-volatile random access control memory to store control data, including status and destination data for each of said cache pages of data, and wherein said controller directs the selective transfer of data to said data transfer channels in accord with said control data.

11. The data storage system of claim 10 wherein the status of said cache pages of data includes free and in-use status data, wherein said controller directs the selective transfer of data from said interface to a predetermined first cache page, and wherein said controller is coupled to said non-volatile random access control memory to enable said controller to concurrently access status data corresponding to a predetermined second cache page.

12. The data storage system of claim 11 wherein said controller provides for the storage of said plurality of cached pages of data in a write data queue, wherein said controller provides for initialization of said direct memory access controller to transfer the data stored by a predetermined one of said cache pages of data in said write data queue to a predetermined one of said data buffers, and wherein said controller operates to reduce and restructure the contents of said cache pages of data within said write data queue by removing duplicate data and re-ordering the remaining data of said cached pages of data in said write data queue.

13. The data storage system of claim 12 wherein said controller further provides for the transfer of read data from said data buffers to said interface without passing through said non-volatile random access memory, said controller further providing for coherency control over read data requests received by said controller by directing the selective transfer of data between said non-volatile random access memory rather than from said data transfer channels.

14. The data storage system of claim 13 wherein said data storage system is subject to selective application of power, wherein said controller further provides for the search of said non-volatile random access memory for cached pages of data on application of power, wherein said controller provides for the transfer of a found cached page of data to a predetermined one of said plurality of said data channels, said controller being responsive to said control data corresponding to said found cached page of data.

15. The data storage system of claim 9 wherein predetermined write data, representing a network originated data file transfer, is received through said interface means pursuant to a predetermined write request message received by said controller, and wherein said controller provides a write acknowledgement message on committing said predetermined write data to said non-volatile random access memory, whereby the latency of said data storage system in providing said predetermined write acknowledgement message is reduced.

16. The data storage system of claim 15 wherein said predetermined write data, represents a network file system (NFS) originated data file transfer.

* * * * *